US012567529B2

(12) United States Patent
Laneryd et al.

(10) Patent No.: US 12,567,529 B2
(45) Date of Patent: Mar. 3, 2026

(54) STATIC ELECTRIC INDUCTION DEVICE AND OPERATING METHOD

(71) Applicant: Hitachi Energy Ltd, Zürich (CH)

(72) Inventors: Tor Laneryd, Enköping (SE); Andreas Gustaf Thomas Gustafsson, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/718,923

(22) PCT Filed: Nov. 21, 2022

(86) PCT No.: PCT/EP2022/082597
§ 371 (c)(1),
(2) Date: Jun. 12, 2024

(87) PCT Pub. No.: WO2023/110300
PCT Pub. Date: Jun. 22, 2023

(65) Prior Publication Data

US 2024/0420880 A1 Dec. 19, 2024

(30) Foreign Application Priority Data

Dec. 17, 2021 (EP) .................................... 21215441

(51) Int. Cl.
*H01F 27/12* (2006.01)

(52) U.S. Cl.
CPC .................................. *H01F 27/12* (2013.01)

(58) Field of Classification Search
CPC ................................................ H01F 27/00–40
(Continued)

(56) References Cited

U.S. PATENT DOCUMENTS 4,000,482 A 12/1976 Staub et al.

FOREIGN PATENT DOCUMENTS

DE 2605960 A1 8/1977
EP 0785560 A1 7/1997
(Continued)

OTHER PUBLICATIONS

International Search Report and Written Opinion of the International Searching Authority, International Application No. PCT/EP2022/082597, mailed Jan. 23, 2023, 20 pages.
(Continued)

*Primary Examiner* — Tuyen T Nguyen
(74) *Attorney, Agent, or Firm* — Sage Patent Group

(57) ABSTRACT

In one example, the static electric induction device includes:
a heat-generating component which is subject to electric induction, and
a duct system configured to lead a coolant along the heat-generating component, wherein
the duct system includes a plurality of cross channels and at least two longitudinal channels, each one of the longitudinal channels is assigned to at least some of the cross channels and the assigned cross channels connect the respective longitudinal channels with each other, and
the duct system further includes at least one flow obstruction located in at least one of the longitudinal channels, the flow obstruction is configured to allow flow of the coolant through it and locally narrows a cross-section of the respective longitudinal channel by at least 75%.

7 Claims, 2 Drawing Sheets

(58) Field of Classification Search
USPC ........................................................ 336/55–62
See application file for complete search history.

(56) References Cited

FOREIGN PATENT DOCUMENTS

| | | | | |
|---|---|---|---|---|
| EP | 3817512 | A1 | | 5/2021 |
| JP | 2000077236 | A | | 3/2000 |
| JP | 2000357615 | A | * | 12/2000 |
| JP | 2010153440 | A | * | 7/2010 |
| JP | 2014007304 | A | * | 1/2014 |

OTHER PUBLICATIONS

Extended European Search Report, European Application No. 21215441.3, mailed Jun. 13, 2022, 15 pages.
International Preliminary Report on Patentability, International Application No. PCT/EP2022/082597, mailed Jun. 29, 2023, 17 pages.

* cited by examiner

STATIC ELECTRIC INDUCTION DEVICE AND OPERATING METHOD

CROSS-REFERENCE TO RELATED APPLICATIONS

This application is a 35 U.S.C. § 371 national stage application of PCT International Application No. PCT/EP2022/082597 filed on Nov. 21, 2022, which in turn claims priority to European Patent Application No. 21215441.3, filed on Dec. 17, 2021, the disclosures and content of which are incorporated by reference herein in their entireties.

TECHNICAL FIELD

A static electric induction device is provided. Further, an operating method for a static electric induction device is provided.

BACKGROUND

Document WO 2015/040213 A1 refers to a static electric induction device.

SUMMARY

A problem to be solved is to provide a static electric induction device that can be cooled efficiently.

This object is achieved, inter alia, by a static electric induction device and by a method as defined in the independent patent claims. Exemplary further developments constitute the subject-matter of the dependent claims.

For example, the static electric induction device comprises a flow obstruction in a duct system, the flow obstruction works as a bypass which allows a minor flow throughput, compared with a main duct flow throughput, so that an increased speed of a coolant can be achieved.

In at least one embodiment, the static electric induction device comprises:

- a heat-generating component which is subject to electric induction, and
- a duct system configured to lead a coolant along the heat-generating component, wherein

- the duct system includes a plurality of cross channels and at least two longitudinal channels, each one of the longitudinal channels is assigned to at least some of the cross channels and the assigned cross channels connect the respective longitudinal channels with each other, and
- the duct system further includes at least one flow obstruction located in at least one of the longitudinal channels, the flow obstruction is configured to allow flow of the coolant through it and locally narrows a cross-section of the respective longitudinal channel by at least 75%.

Static means, for example, that the device does not move in the intended operation. The heat generated by the heat-generating component during the intended operation may result from reversal of magnetism and/or from an electric resistivity of the heat-generating component. The heat-generating component is, for example, a power transformer.

The duct system can be considered as part of a cooling system, and the duct system may include at least two or exactly two types of internal ducts, that is, the longitudinal channels and the cross channels. However, in addition to the cross channels and the longitudinal channel which can be located directly at the heat-generating component, there may also be supply pipes, for example, running from the longitudinal channels to a pump and/or a cooler of the cooling system.

The number of cross channels may exceed a number of the longitudinal channels, for example, by at least a factor of two or by at least a factor of three. A cross-sectional area of the longitudinal channels may be larger than a cross-sectional area of the cross channels, for example, by at least a factor of two.

A cooling design of power transformers impacts both size and the energy efficiency of the transformer. Improved cooling allows the transformer to be made smaller, or alternatively to improve its energy efficiency because losses increase with temperature. The highest losses occur in the transformer winding. The most effective cooling of liquid-filled power transformers is Oil-Directed, OD, cooling. For simplicity, the term 'oil' is at times used herein as designation for the coolant, also this term includes any dielectric liquid suitable for transformer cooling, which can include mineral oil, natural esters, synthetic esters, isoparaffinic liquids, and other liquids.

For example, the winding has a number of radial and axial cooling ducts where oil can flow, that is, the cross channels and the longitudinal channels, respectively. In particular, old oil is distributed azimuthally through a pressure chamber installed below the winding and enters the axial cooling ducts at the bottom. After absorbing heat from the winding, hot oil exits the axial cooling ducts at a top into a transformer tank. A pump sucks oil from the top of the tank and forces it through a cooler where the oil is cooled down before reentering the pressure chamber.

Typically, barriers like oil guiding rings can be placed in the axial cooling ducts to force the oil to traverse the radial cooling ducts. Because of fluid dynamic effects, the oil does not distribute evenly among the radial ducts. Some radial ducts will have higher local oil velocity and other radial ducts will have lower local oil velocity. Cooling performance increases with oil velocity. Higher pump flow rate will generate higher oil velocities in the winding and can therefore be used to improve cooling compared to a lower pump flow rate.

However, high oil velocities also amplify the fluid dynamic effects that cause uneven distribution of oil within the winding. Therefore, local oil velocities can become lower at a high pump flow rate. This means that there is a maximum flow rate of the pump that can be used before the maximum winding temperature, also known as the winding hot spot temperature, starts to increase. Fluid dynamic effects are non-linear, so a small deviation from the thermal design calculation due to manufacturing tolerances might lead to excessive temperatures.

The winding hot spot for OD cooling typically occurs just above the location of an oil guiding ring due to the Venturi effect. The Venturi effect is a reduction of pressure corresponding to an increase of fluid velocity in a constricted flow passage point. The low local pressure may be insufficient to force oil into the adjacent radial oil duct and may lead to recirculating flow.

In the static electric induction device described herein, the problem of low radial oil speed can be solved by allowing a controlled amount of oil to bypass the oil guide and pass straight on up through the axial duct. The upwards flow in the axial duct opposite the oil guide induces increased oil flow in the radial duct directly above the oil guide and will counteract recirculating flow. Thereby the winding hot spot temperature is reduced.

A controlled amount of oil flow through the oil guide can be achieved by making one or more holes of predefined shape in the oil guiding. The holes might be circular. The at least one hole might not necessarily be a hole in the oil guiding ring itself, but a constricted flow passage bounded by the oil guiding ring, vertical insulation cylinders, and vertical spacers, for example.

The static electric induction device makes it possible to use a higher pump flow rate, thereby improving cooling beyond what is possible with conventional OD technology. The improved cooling can be used to make the transformer more compact, thereby saving material cost or increasing loading capability for locations where transformer size is limited such as offshore wind platforms or urban environments. Alternatively, the improved cooling can be used to reduce the overall temperature of the transformer, thereby improving energy efficiency, because losses increase with temperature. The static electric induction device allows to increase the robustness of the device design in case there are deviations between the thermal design calculations and the manufactured unit.

Thus, the static electric induction device allows high-speed OD cooling of power transformers, for example.

In at least one embodiment, the static electric induction device may comprise a tank filled with a dielectric liquid, a heat-generating component comprising two vertical cooling ducts, a multitude of horizontal cooling ducts connecting the two vertical cooling ducts, at least one flow obstruction within one of the vertical cooling ducts, a pump configured to generate a flow of dielectric liquid through the cooling ducts, wherein the flow obstruction is configured to allow a controlled amount of oil flow, in particular less than 25%, to bypass the flow obstruction.

The flow obstruction can be mechanically attached to the heat-generating device and/or can be mechanically attached to an insulating surface bounding the axial cooling duct. For example, the flow obstruction is a guiding ring. For example, the bypass flow is through at least one opening partially bounded by the oil guiding ring and/or the bypass flow is through at least one hole in the oil guiding ring. The at least one hole in the oil guiding ring could be circular.

According to at least one embodiment, the heat-generating component comprises a plurality of electric conductor sections. The electric conductor sections can be stacked one above the other, in particular along a direction of main extent of the longitudinal channels.

According to at least one embodiment, the cross channels run in each case between adjacent ones of the electric conductor sections. In other words, the cross channels are configured as ducts through the electric conductor sections.

According to at least one embodiment, along the direction of main extent the at least one flow obstruction is thinner than the electric conductor sections. Hence, seen in cross-section perpendicular to the cross channels, an overall area of the electric conductor sections may exceed an overall area of the cross channels.

According to at least one embodiment, the heat-generating component is a transformer, in particular a power transformer. Power transformer could mean that the heat-generating component is configured for a power of at least 10 MVA or at least 50 MVA. Alternatively or additionally, the heat-generating component is configured for a power of at most 0.5 GVA or of at most 1 GVA. Thus, the electric conductor sections can be transformer windings.

For example, the winding comprises a cable that comprises a multitude of electric conductors. The cable is wound around the transformer core with a certain number of turns. Several turns of the cable may be configured close together in the shape of a disc. This may be referred to as a transformer disc winding. Hence, the term 'winding' also includes a disc winding.

The duct system can be applied at high voltage windings and/or at low voltage windings. If the heat-generating component is a transformer, it may be of a core type or also of a shell type.

According to at least one embodiment, the at least one flow obstruction is mechanically permanently connected with the duct system and/or the heat-generating component. For example, the at least one flow obstruction is attached to the respective component by gluing, clamping, soldering, welding, screwing and/or riveting.

According to at least one embodiment, the at least one flow obstruction is free of parts which are configured to be movable in the intended use of the static electric induction device. Hence, the at least one flow obstruction may comprise of fix parts and/or may be rigid in the intended operation of the static electric induction device. In particular, the at least one flow obstruction is free of flaps or valves or the like.

According to at least one embodiment, the at least one flow obstruction comprises an obstruction plate having one or a plurality of bypass openings. The at least one bypass opening configured to be passed through by the coolant. For example, the at least one bypass opening is permanently open and is not configured to be closed at times.

According to at least one embodiment, the at least one obstruction plate is arranged in elongation with at least one of the cross channels. For example, the at least one obstruction plate is located in the at least one assigned longitudinal channel. Hence, the respective channel comprises a constriction or narrowing realized by the at least one flow obstruction.

According to at least one embodiment, the at least one bypass opening is arranged in a center region of the obstruction plate. Hence, the respective at least one bypass opening can be located centrically in the respective longitudinal channel.

According to at least one embodiment, the at least one flow obstruction comprises a plurality of the bypass openings. All the bypass openings in the respective flow obstruction can be of the same shape, or there are bypass openings of different shapes.

According to at least one embodiment, the cross channels and/or the longitudinal channels have a cross-section with an aspect ratio of at least 3 or of at least 5 so that a length of the respective cross-section exceeds a width of the respective cross-section by a factor equal to the aspect ratio. Alternatively or additionally, said factor is at most 20.

According to at least one embodiment, the at least one flow obstruction is part of a coolant guiding ring surrounding the heat-generating component along a circumference for at least 270° or for at least 330° or completely, or being surrounded by the heat-generating component for at least 270° or at least 330° or completely, seen in top view of the coolant guiding ring.

The coolant guiding ring may extend over a plurality of the longitudinal channels, the respective longitudinal channels may be arranged in parallel with one another along an axial direction of the heat-generating component. For example, the coolant guiding ring may serve for mechanically supporting the heat-generating component.

According to at least one embodiment, the coolant guiding ring is located between two adjacent sub-stacks of the electric conductor sections. In a first one of said sub-stacks the coolant is configured to run in an anti-parallel manner in the cross channels compared with a second one of said sub-stacks. The sub-stacks may follow one another along the assigned longitudinal channels. For example, per sub-stack there are at least 3 or at least 6 of the cross channels. Alternatively or additionally, there are at most 30 or at most 15 of the cross channels per sub-stack. It is possible that there are exactly two of the longitudinal channels for all the sub-stacks that are stacked one above the other along the axial direction of the heat-generating component.

For example, seen in top view, the cross channels have the shape of a circular ring sector, and seen in cross-section the cross channels may be of rectangular or approximately rectangular shape.

According to at least one embodiment, the coolant guiding ring is an annulus and comprises a plurality of the flow obstructions so that a plurality of the corresponding longitudinal channels are arranged in parallel with each other. It is possible that adjacent ones of said longitudinal channels are separated from one another by spacer ribs. For example, the spacer ribs run between adjacent coolant guiding rings and may be limited by the respective coolant guiding rings.

According to at least one embodiment, the at least one flow obstruction narrows the cross-section of the respective longitudinal channel by at least 80% or by at least 85% or by at least 90%. Alternatively or additionally, said value is at most 98% or at most 95% or at most 91%.

According to at least one embodiment, the cross channels are oriented in a horizontal manner and the longitudinal channels are oriented in a vertical manner. This applies, for example, with a tolerance of at most 15° or of at most 5°.

According to at least one embodiment, the static electric induction device further comprises one, any two or all of the following components:

- a tank housing the heat-generating component,
- a pump configured to circulate the coolant through the duct system,
- a cooler connected by means of the duct system; the cooler may be a heat exchanger towards air or towards water, like sea water.

According to at least one embodiment, the tank is configured to be filled with the coolant and the duct system is configured to lead the coolant from the pump and the cooler through the tank. This applies, for example, for at least 50% or for at least 90% of the coolant, concerning one round trip through the duct system. It is possible that there is a separate bypass allowing a small part of the coolant to bypass the heat-generating component.

According to at least one embodiment, the pump and the cooler are located outside the tank. Hence, only part of the duct system and the heat-generating component may be located within the tank. It is possible that the duct system together with the tank is a closed system in intended operation so that the coolant does not leave the duct system, the tank and, if present, the pump as well as the cooler.

If there is a plurality of the flow obstructions, it is possible that all the flow obstructions are of the same design. Otherwise, different kinds of flow obstructions can be combined with each other.

A method for operating the static electric induction device is additionally provided. By means of the method, a static electric induction device is operated as indicated in connection with at least one of the above-stated embodiments. Features of the static electric induction device are therefore also disclosed for the method and vice versa.

In at least one embodiment, the method is for operating the static electric induction device, wherein in operation the pump pumps the coolant through the cooler and the duct system so that the heat-generating component is cooled by means of a flow of the coolant. Seen along the longitudinal channels, at most 25% or at most 10% of a coolant flow is through the at least one flow obstruction.

BRIEF DESCRIPTION OF THE DRAWINGS

A static electric induction device and an operating method described herein are explained in greater detail below by way of exemplary embodiments with reference to the drawings. Elements which are the same in the individual figures are indicated with the same reference numerals. The relationships between the elements are not shown to scale, however, but rather individual elements may be shown exaggeratedly large to assist in understanding.

In the figures.

DETAILED DESCRIPTION

Figure 1:
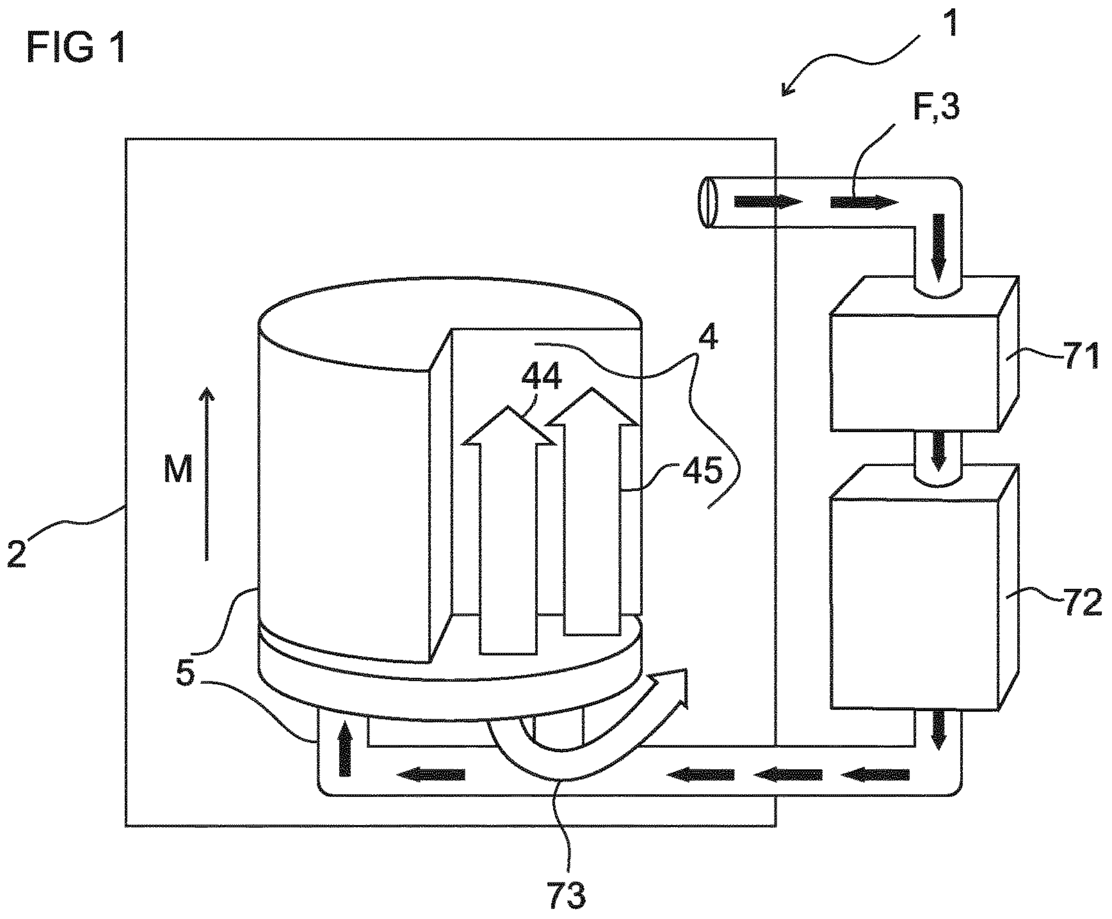
FIG. 1 is a schematic perspective sectional view of an exemplary embodiment of a static electric induction device described herein.

FIG. 1 illustrates an exemplary embodiment of a static electric induction device 1. The static electric induction device 1 comprises a tank 2 in which a heat-generating component 2, like a power transformer, is located. As an option, the heat-generating component 4 could comprise an inner winding 44, for example, a low voltage winding, and an outer winding 45, for example, a high voltage winding. The power transformer can be of a core type as illustrated in FIG. 1, but can alternatively also be of a shell type.

Further, the device 1 comprises a duct system 5 having various ducts and optionally a pressure chamber in which the heat-generating component 4 is accommodated. The ducts connect the pressure chamber with a pump 71 and a cooler 72, and the pressure chamber is located inside the tank 2. As a further option, there can be a separate bypass 73 that allows flow of a coolant 3 outside of the pressure chamber. A flow direction F of the coolant 3 is symbolized by arrows.

Figure 2:
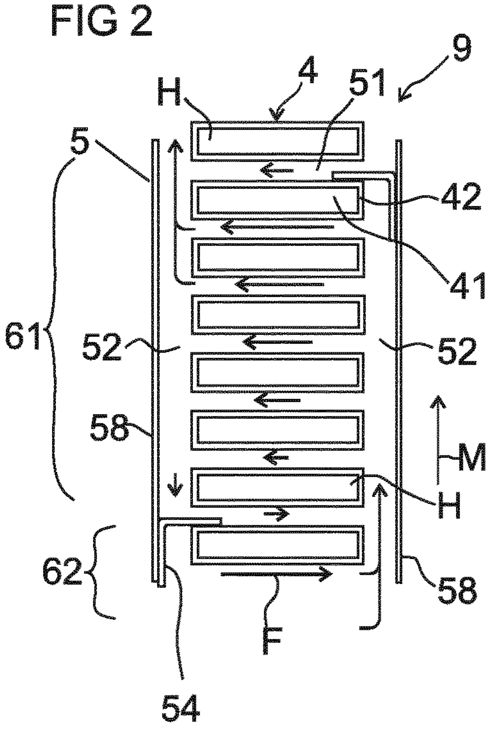
FIGS. 2 and 3 are schematic sectional views of modified static electric induction devices.
Figure 3:
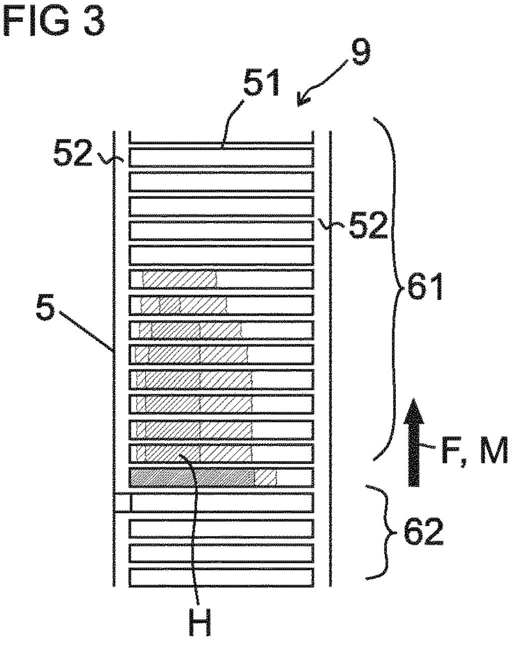

FIGS. 2 and 3 illustrate cross-sectional views through the heat-generating component 4 of a modified static electric induction device 9 wherein for simplicity of the drawing only a part of one of the windings 44, 45 of FIG. 1 is schematically illustrated.

The duct system 5, compare in particular FIG. 2, comprises longitudinal channels 52 having a direction M of main extent, and further comprises a plurality of cross channels 51. The windings are stacked one above the other and may be composed of an electric conductor section 41 and of an electric insulation 42; however, an inner configuration of the windings could be much more complex than illustrated in FIG. 2. Hence, adjacent windings are distant from one another and the cross channels 51 run between adjacent conductor sections 41 and connect the assigned longitudinal channels 52 with one another. In a lateral direction, on a side remote from the heat-generating component 4, the longitudinal channels 52 are limited by duct walls 58. The duct walls 58 can be wall of the pressure chamber of FIG. 1.

For example, a height of the cross channels along the direction M of main extent is at least 1 mm and/or at most 10 mm. Alternatively or additionally, a width of the cross channels 51 perpendicular to the plane of projection of FIG. 2 is at least 2 cm and/or is at most 30 cm.

Alternatively or additionally, a thickness of the windings between adjacent cross channels 51 is at least 2 mm and/or is at most 5 cm. Alternatively or additionally, a breadth of the longitudinal channels 51 perpendicular to the direction M of main extent is at least 2 mm and/or is at most 3 cm. Optionally, in the direction perpendicular to the plane of projection of FIG. 2, the cross channels 51 and the longitudinal channels 52 can have the same width.

The conductor sections 41 can be grouped into sub-stacks 61, 62. For example, per sub-stack 61, 62 there are at least 5 and/or at most 15 of the windings and, thus, of the cross channels 51. Within a specific sub-stack 61, 62, intentionally the coolant 3 flows in the same direction, indicated by the arrows that symbolize the flow direction F. Between adjacent sub-stacks 61, 62 there is a redirection flow obstruction 54 in one of the associated longitudinal channels 52. These redirection flow obstructions 54 are impermeable for the coolant 3. Hence, by means of the redirection flow obstructions 54 all the arriving coolant is redirected, for example, by 90°.

Accordingly, due to the Venturi effect at the winding next to the redirection flow obstruction 54 the flow direction can be inverted so that a circular flow around the respective winding results. However, such a circular flow leads to a decreased cooling of the respective winding so that a local hot spot H arises. This is shown only schematically in FIG. 2, and in FIG. 3 the local hot spot H is illustrated in more detail by means of the hatchings.

The strength of the Venturi effect is dependent on the flow speed of the coolant 3. For transformer oil, in order to avoid such local hot spots H, the maximum allowable speed is around 0.3 m/s, for example, in a typical configuration. Because occurrence of only one local hot spot H may lead to severe damage of the device 1, the maximum coolant speed is in particular limited to the case where no significant local hot spots H arise due to the Venturi effect.

Figure 4:
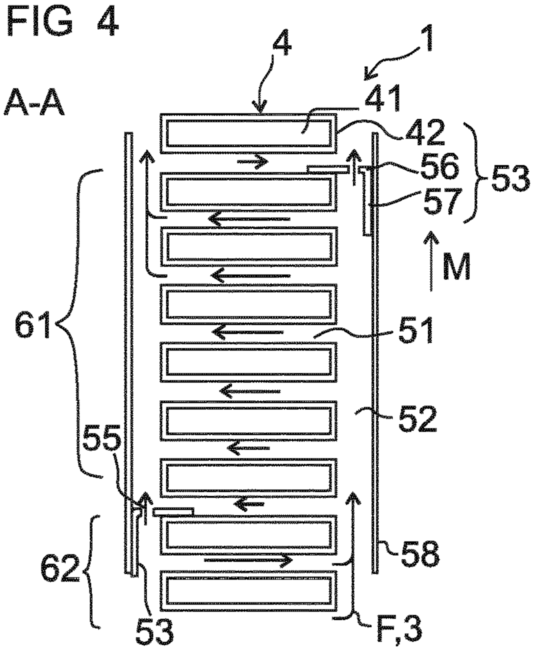
FIGS. 4 and 5 are schematic sectional views of exemplary embodiments of static electric induction devices and of an operating methods described herein.
Figure 5:
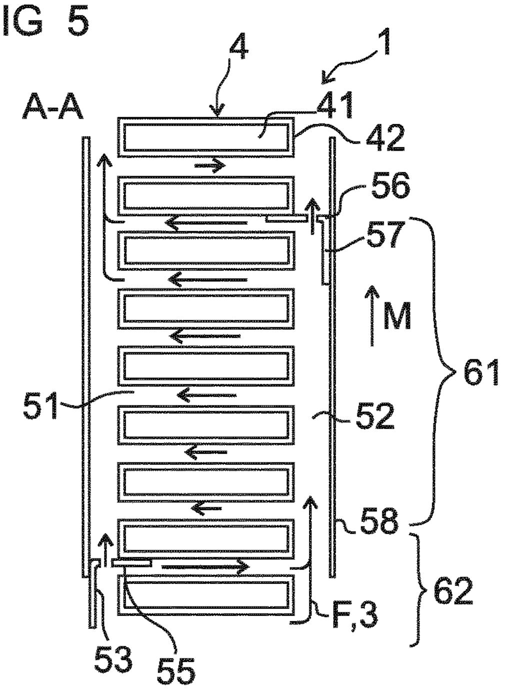
Figure 6:
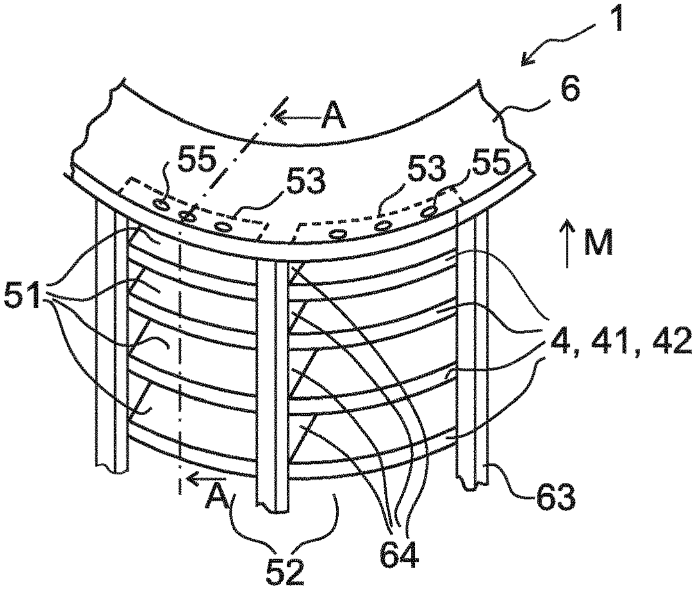
FIG. 6 is a schematic perspective view of an exemplary embodiment of a static electric induction device described herein.

In FIGS. 4 to 6, exemplary embodiments of the static electric induction device 1 are illustrated, wherein FIG. 6 provides a perspective view of a part of the device 1 and FIGS. 4 and 5 show sectional views of slightly different embodiments.

Compared with the modified static electric induction device 9 of FIG. 2, in the static electric induction device 1 of FIGS. 4 to 6 the redirection flow obstructions 54 are replaced by flow obstructions 53 which allow a minor fraction of the coolant 3 to pass through. For example, a cross-sectional area of the respective longitudinal channel 52 is reduced by the assigned flow obstruction 53 by at least 75% and by at most 95%. Hence, some of the coolant 3 flows through the respective flow obstructions 53.

Thus, the strength of the Venturi effect at the adjacent cross channel 51 can be reduced and an overall higher flow speed of the coolant 3 through the channels 51, 52 is enabled. For example, the flow speed can be increased by a factor between 1.5 and 3 compared with the modified static electric induction device 9 so that in the static electric induction device 1 flow speeds of the coolant 3 of up to 1 m/s may be realized. By increasing the flow speed, the cooling can be improved.

For example, the flow obstructions 53 each comprise a obstruction plate 56 in which at least one bypass opening 55 is formed. It is possible that the obstruction plates 56 are mounted onto the duct wall 58 or alternatively onto the respectively assigned winding, or onto both. Mounting could be achieved, for example, by means of a mounting plate 57 running in parallel with the direction M of main extent.

According to FIG. 4, the flow obstructions 53 and consequently the part of the obstruction plates 56 having the bypass openings 55 run in elongation with a top side of the uppermost winding of the lower sub-stack 62, seen along the direction M of main extent of the longitudinal channels 52. Contrary to that, according to FIG. 5 the flow obstructions 53 and consequently the part of the obstruction plates 56 having the bypass openings 55 run in elongation with a bottom side of the lowermost winding of the upward sub-stack 61, again seen along the direction M of main extent. It is also possible that the two variants of FIGS. 4 and 5 are both realized in the static electric induction device 1.

In FIG. 6 it is further illustrated that the flow obstructions 53 may alternatively be integrated in a coolant guiding ring 6 so that the coolant guiding ring 6 comprises at least one bypass opening 55 per associated longitudinal channel 52. As an option, a plurality of the longitudinal channels 52 can be arranged in parallel with one another all around the heat-generating component 4. Adjacent longitudinal channels 52 can be separated from one another by spacer ribs 63 which run along the direction M of main extent. Between adjacent windings, there can be conductor section spacers 64.

Concerning the configuration of the ribs 63, the spacers 64 and the channels 51, 52, reference is also made to document WO 2015/040213 A1, in particular to FIG. 1 and page 11, lines 12 to 23, as well as FIG. 4 and page 13, line 15, to page 14, line 30, the disclosure content of which is hereby included by reference.

Otherwise, the same as to FIGS. 1 to 3 may also apply to FIGS. 4 to 6, and vice versa.

Figure 7:
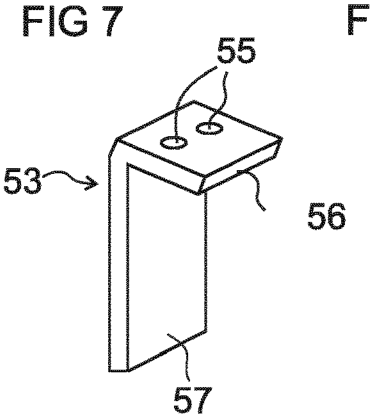
FIGS. 7 to 9 are schematic perspective views of flow obstructions for exemplary embodiments of static electric induction devices described herein.
Figure 8:
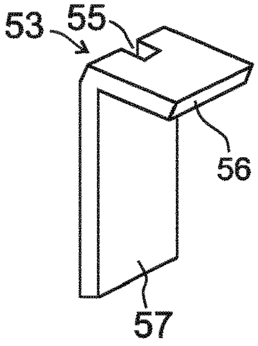
Figure 9:
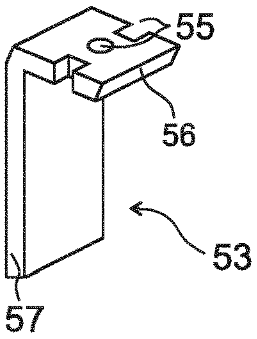

In FIGS. 7 to 9, some possible examples of the flow obstructions 53 are illustrated. According to FIG. 7, the flow obstruction 53 comprises the obstruction plate 56 and the mounting plate 57. It is possible that the obstruction plate 56 is shorter than the mounting plate 57.

The plates 56, 57 could be manufactured from one piece, for example, by bending. Otherwise, the flow obstruction 53 could be produced by casting or pressing or molding. For example, the flow obstruction 53 are of a dielectric material like a polymeric material. Composites of a plurality of materials are also possible.

In FIG. 7, there is a plurality of the bypass openings 55 which may be arranged, for example, along a straight line. All the bypass openings 55 can be of the same shape. The bypass openings 55 completely run through the obstruction plate 56. There can be more than the two bypass openings 55 shown in FIG. 7, for example, there are at least three bypass openings 55 and/or at most eight bypass openings 55 per flow obstruction. In the direction perpendicular to the mounting plate 57, the bypass openings 55 can be located in a middle third of the obstruction plate 56.

In a lateral direction, in parallel with the line along which the bypass openings 55 are arranged, the mounting plate 57 and/or the obstruction plate 56 may directly adjoin the spacer ribs.

Otherwise, the same as to FIGS. 1 to 6 may also apply to FIG. 7, and vice versa.

According to FIG. 8, the bypass opening 55 is located next to the mounting plate 57, that is, in an outermost third of the obstruction plate 56 and, thus, next to the duct wall 58. Moreover, the bypass opening 55 does not need to be of circular shape as in FIG. 7, but can be of square or rectangular shape, too. Again, there can be more than one bypass opening 55 per obstruction plate 56.

Otherwise, the same as to FIG. 7 may also apply to FIG. 8, and vice versa.

According to FIG. 9, there is a plurality of the bypass openings 55, and the bypass openings 55 can have different shapes. As an option, one or some or all of the bypass openings 55 can be arranged at an edge of the obstruction plate 56, in particular next to the spacer ribs.

Otherwise, the same as to FIGS. 7 and 8 may also apply to FIG. 9, and vice versa.

The components shown in the figures follow, unless indicated otherwise, exemplarily in the specified sequence directly one on top of the other. Components which are not in contact in the figures are exemplarily spaced apart from one another. If lines are drawn parallel to one another, the corresponding surfaces may be oriented in parallel with one another. Likewise, unless indicated otherwise, the positions of the drawn components relative to one another are correctly reproduced in the figures.

The term 'and/or' describes only an association relationship for describing associated objects and represents that three relationships may exist. For example, A and/or B may represent the following three cases: Only A exists, both A and B exist, and only B exists. Correspondingly, the wording 'at least one of A, B and C' may represent the following seven cases: Only A exists, only B exists, only C exists, both A and B exist, both A and C exist, both B and C exist, as well as all three A and B and C exist; the same applies analogously if there are only two or more than three entities in the list following 'at least one of'. Thus, 'at least one of A and B' is equivalent to 'A and/or B'.

The static electric induction device described here is not restricted by the description on the basis of the exemplary embodiments. Rather, the static electric induction device encompasses any new feature and also any combination of features, which includes in particular any combination of features in the patent claims, even if this feature or this combination itself is not explicitly specified in the patent claims or exemplary embodiments.

LIST OF REFERENCE SIGNS

1 static electric induction device
2 tank
3 coolant
4 heat-generating component
41 electric conductor section
42 electric insulation
44 inner winding
45 outer winding
5 duct system
51 cross channel
52 longitudinal channel
53 flow obstruction
54 redirection flow obstruction
55 bypass opening
56 obstruction plate
57 mounting plate
58 duct wall

6 coolant guiding ring
61 first sub-stack
62 second sub-stack
63 spacer rib
64 conductor section spacer
71 pump
72 cooler
73 separate bypass
9 modified static electric induction device
F flow direction of the coolant
H local hot spot
M direction of main extent of the longitudinal channels

The invention claimed is:

1. A static electric induction device comprising:

a heat-generating component which is subject to electric induction, and a duct system configured to lead a coolant along the heat-generating component, wherein the duct system includes a plurality of cross channels and longitudinal channels, each of the longitudinal channels having a cross-sectional area and each one of the longitudinal channels being assigned to at least some of the cross channels and the assigned cross channels connect the longitudinal channels with each other, the duct system further includes at least one flow obstruction located in at least one of the longitudinal channels, the flow obstruction is configured to allow flow of the coolant through it and locally narrows the cross-sectional area of the at least one of the longitudinal channels by at least 75% so that a bypass for the coolant is realized, the heat-generating component comprises a plurality of electric conductor sections stacked one above the other along a direction of main extent of the longitudinal channels, the cross channels in each case run between adjacent ones of the electric conductor sections, and along the direction of main extent the at least one flow obstruction is thinner than the electric conductor sections, the heat-generating component is a transformer and the electric conductor sections are transformer windings, the at least one flow obstruction comprises an obstruction plate having a plurality of bypass openings configured to be passed through by the coolant, and the at least one flow obstruction further comprises a mounting plate that is mounted to a duct wall limiting at least one of the longitudinal channels and running in parallel with the direction of main extent, the obstruction plate and the mounting plate being manufactured from one piece of a dielectric material which is a polymeric material, wherein the at least one flow obstruction is part of an annular coolant guiding ring surrounding the heat-generating component.

2. The static electric induction device according to claim 1, wherein the at least one flow obstruction is mechanically permanently connected with the heat-generating component.

3. The static electric induction device according to claim 1, wherein the at least one obstruction plate is arranged in elongation with at least one of the cross channels.

4. The static electric induction device according to claim 1, wherein the at least one flow obstruction narrows the cross-section of the respective longitudinal channel by at least 85% and by at most 95%.

5. The static electric induction device according to claim 1, wherein the cross channels are oriented in a horizontal manner and the longitudinal channels are oriented in a vertical manner.

6. The static electric induction device according to claim 1, further comprising:

a tank housing the heat-generating component, a pump configured to circulate the coolant through the duct system, and a cooler connected by means of the duct system wherein the tank is configured to be filled with the coolant and the duct system is configured to lead the coolant from the pump and the cooler through the tank, and the pump and the cooler are located outside the tank.

7. A method for operating the static electric induction device according to claim 1, wherein in operation the pump pumps the coolant through the cooler and the duct system so that the heat-generating component is cooled by means of a flow of the coolant, and wherein, seen along the longitudinal channels, at most 25% of a coolant flow is through the at least one flow obstruction.

* * * * *